United States Patent
Zhao (10) Patent No.: US 11,776,231 B2
(45) Date of Patent: Oct. 3, 2023

(54) METHOD AND APPARATUS FOR DISPLAYING COVERING, AND STORAGE MEDIUM

(71) Applicant: BEIJING BAIDU NETCOM SCIENCE TECHNOLOGY CO., LTD., Beijing (CN)

(72) Inventor: Taotao Zhao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 91 days.

(21) Appl. No.: 17/646,319

(22) Filed: Dec. 29, 2021

(65) Prior Publication Data

US 2022/0122338 A1 Apr. 21, 2022

(30) Foreign Application Priority Data

Apr. 20, 2021 (CN) .......................... 202110426531.7

(51) Int. Cl.
*G06T 19/20* (2011.01)
*G06T 17/05* (2011.01)

(52) U.S. Cl.
CPC .............. *G06T 19/20* (2013.01); *G06T 17/05* (2013.01); *G06T 2210/21* (2013.01); *G06T 2219/2004* (2013.01)

(58) Field of Classification Search
CPC ..... G06T 2200/04; G06T 19/00; G06T 19/20; G06T 17/00; G06T 17/05; G06T 2219/2004; G06T 2210/21; G06F 3/04815
See application file for complete search history.

(56) References Cited

U.S. PATENT DOCUMENTS

2012/0240077 A1* 9/2012 Vaittinen ............. G06F 3/04815
715/781
2019/0180503 A1* 6/2019 Karasudani ............. G06T 19/20

* cited by examiner

*Primary Examiner* — Lixi C Simpson
(74) *Attorney, Agent, or Firm* — Osha Bergman Watanabe & Burton LLP (57) ABSTRACT

A method for displaying a covering on a panoramic map image includes: acquiring covering information to be displayed, in which the covering information includes a plurality of coverings; acquiring a set of vertices of a maximum circumscribed polyhedron for each covering in a three-dimensional coordinate system of a panoramic scene; acquiring a mapped set of vertices of the maximum circumscribed polyhedron of each covering by mapping the set of vertices to a sphere; determining an overlapping result among the plurality of coverings based on the mapped set of vertices of each covering; and determining a target covering from the plurality of coverings based on the overlapping result, and displaying the target covering on the panoramic map image.

15 Claims, 5 Drawing Sheets

METHOD AND APPARATUS FOR DISPLAYING COVERING, AND STORAGE MEDIUM

CROSS-REFERENCE TO RELATED APPLICATION

This application is based upon and claims priority to Chinese Patent Application No. 202110426531.7, filed on Apr. 20, 2021, the entire content of which are incorporated herein by reference.

TECHNICAL FIELD

The disclosure relates to a field of computer technologies, and specifically to a field of map technology, and especially to a method and an apparatus for displaying a covering, and a storage medium.

BACKGROUND

At present, a panoramic map function is provided when a map application is used. When the panoramic map function is operated by a user, some coverings are displayed on a panoramic map image in order to improve a better service.

SUMMARY

According to a first aspect of the disclosure, a method for displaying a covering on a panoramic map image includes: acquiring covering information to be displayed, in which the covering information comprises a plurality of coverings; acquiring a set of vertices of a maximum circumscribed polyhedron for each covering in a three-dimensional (3D) coordinate system of a panoramic scene; acquiring a mapped set of vertices of the maximum circumscribed polyhedron of each covering by mapping the set of vertices to a sphere; determining an overlapping result among the plurality of coverings based on the mapped set of vertices of each covering; and determining a target covering from the plurality of coverings based on the overlapping result, and displaying the target covering on the panoramic map image.

According to a second aspect of the disclosure, an apparatus for displaying a covering on a panoramic map image includes at least one processor and a memory stored with instructions executable by the at least one processor. When the instructions are executed by the at least one processor, the at least one processor is configured to acquire covering information to be displayed, in which the covering information comprises a plurality of coverings; acquire a set of vertices of a maximum circumscribed polyhedron for each covering in a three-dimensional (3D) coordinate system of a panoramic scene; acquire a mapped set of vertices of the maximum circumscribed polyhedron of each covering by mapping the set of vertices to a sphere; determine an overlapping result among the plurality of coverings based on the mapped set of vertices of each covering; and determine a target covering from the plurality of coverings based on the overlapping result, and displaying the target covering on the panoramic map image.

According to a third aspect of the disclosure, a non-transitory computer readable storage medium is stored with computer instructions. When the instructions are executed by a computer, the method for displaying a covering disclosed in the first aspect of the disclosure is implemented.

It should be understood that, the content described in this section is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made on the embodiments described herein without departing from the scope of the present disclosure. Similarly, for clarity and conciseness, descriptions of well-known functions and structures are omitted in the following descriptions.

In the related art, the panoramic map function of the map application is activated, an overlap among coverings on the panoramic map image may affect the user to view or operate the coverings. Therefore, it is an urgent technical problem to be solved how to accurately display a covering on the panoramic map image without the overlapping phenomenon.

A method and an apparatus for displaying a covering, and a storage medium in the embodiments of the disclosure are described with reference to drawings.

Figure 1:
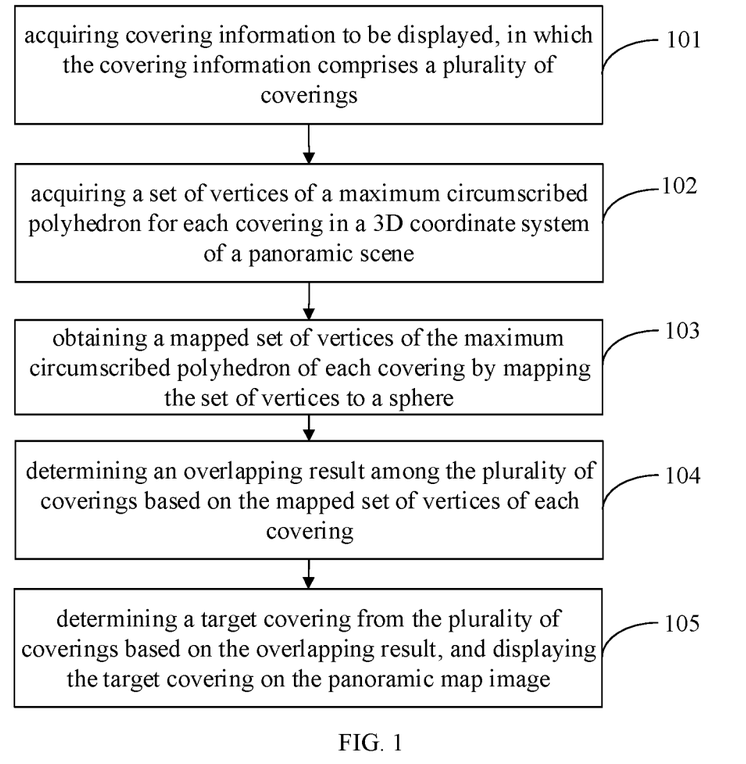
FIG. 1 is a flowchart of a method for displaying a covering according to an embodiment of the disclosure.

FIG. 1 is a flowchart of a method for displaying a covering according to an embodiment of the disclosure.

As illustrated in FIG. 1, the method for displaying a covering may include the following steps at 101-105.

At 101, covering information to be displayed on a panoramic map image is acquired. The covering information includes a plurality of coverings.

The executive body of the method for displaying a covering is an apparatus for displaying a covering. The apparatus may be implemented by means of softwares and/or hardwares and may be configured in an electronic device. The electronic device may include, but not limited to, a terminal device, a server, etc., which is not limited here.

In an example embodiment, when a map application is operated, an interaction interface of the map application is provided with a panoramic function control. In response to receiving a trigger operation on the panoramic function control (for example, clicking the panoramic function control), a panoramic map image is acquired based on location information of the terminal, and covering information to be displayed on the panoramic map image is acquired. The covering information includes a plurality of coverings.

The covering herein may refer to any object superimposed or overlapped above the panoramic map image. For example, the above covering may be a control for entering an interior display interface corresponding to a point of interest (POI), or an arrow control for a map beacon, or a control for entering a comment page, etc.

At 102, a set of vertices of a maximum circumscribed polyhedron for each covering in a three-dimensional (3D) coordinate system of a panoramic scene is acquired.

At 103, a mapped set of vertices of the maximum circumscribed polyhedron of the covering is acquired by mapping the set of vertices to a sphere model.

At 104, an overlapping result among the plurality of coverings is determined based on the mapped set of vertices of each of the coverings.

At 105, based on the overlapping result, a target covering is determined from the plurality of coverings, and displayed on the panoramic map image.

In some embodiments, the overlapping result includes an overlapping result of any two of the coverings. When the overlapping result of any two of the coverings indicates that there is an overlap between the corresponding two coverings, a display priority of two coverings may be acquired. The covering with a high priority is taken as a target covering and displayed on the panoramic map image.

In the method for displaying a covering according to the embodiment of the disclosure, covering information to be displayed on the panoramic map image is acquired, the set of vertices of the maximum circumscribed polyhedron for each covering in the 3D coordinate system of the panoramic scene is acquired, the mapped set of vertices of the maximum circumscribed polyhedron of the covering is acquired by mapping the set of vertices to the sphere model, the overlapping result among the plurality of coverings is determined based on the mapped set of vertices of each covering, and the target covering is determined from the plurality of coverings based on the overlapping result and displayed on the panoramic map image. Thus, the overlapping result among the plurality of coverings is accurately determined based on the set of vertices of each covering mapped to the sphere model, and the covering is accurately displayed on the panoramic map image based on the overlapping result, which improves the display result of the covering on the panoramic map image.

Figure 2:
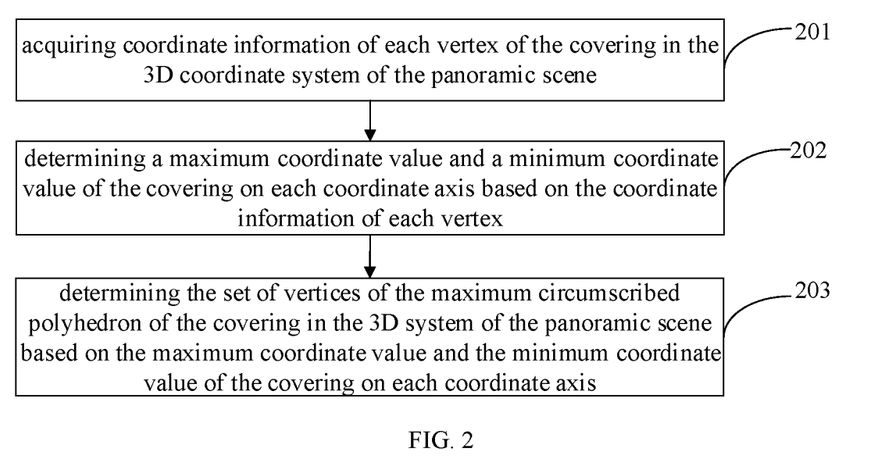
FIG. 2 is a detailed flowchart of the step at 102.

In an embodiment of the disclosure, in order to accurately determine the set of vertices of the maximum circumscribed polyhedron for each covering in the 3D coordinate system of the panoramic scene, as illustrated in FIG. 2, the step at 102 may include the following steps at 201-203.

At 201, coordinate information of each vertex of each covering in the 3D coordinate system of the panoramic scene is acquired.

At 202, a maximum coordinate value and a minimum coordinate value of each covering on each coordinate axis are determined based on the coordinate information of each vertex.

In the embodiment of the disclosure, the maximum coordinate value and the minimum coordinate value of the covering on x coordinate axis, y coordinate axis and z coordinate axis may be determined based on the coordinate information of vertices.

At 203, a set of vertices of the maximum circumscribed polyhedron of the covering in the 3D coordinate system of the panoramic scene is determined based on the maximum coordinate value and the minimum coordinate value of the covering on each coordinate axis.

In the embodiment, when the maximum coordinate value and the minimum coordinate value of the covering on x coordinate axis, y coordinate axis and z coordinate axis are acquired, the maximum coordinate value and the minimum coordinate value of the covering on x coordinate axis, y coordinate axis and z coordinate axis may be combined to acquire a set of vertices of the maximum circumscribed polyhedron of the covering in the 3D coordinate system of the current panoramic scene.

In the embodiment, in combination with coordinate information of each vertex of the covering in the 3D coordinate system of the current panoramic scene, the set of vertices of the maximum circumscribed polyhedron of the covering in the 3D coordinate system of the panoramic scene is accurately determined.

Figure 3:
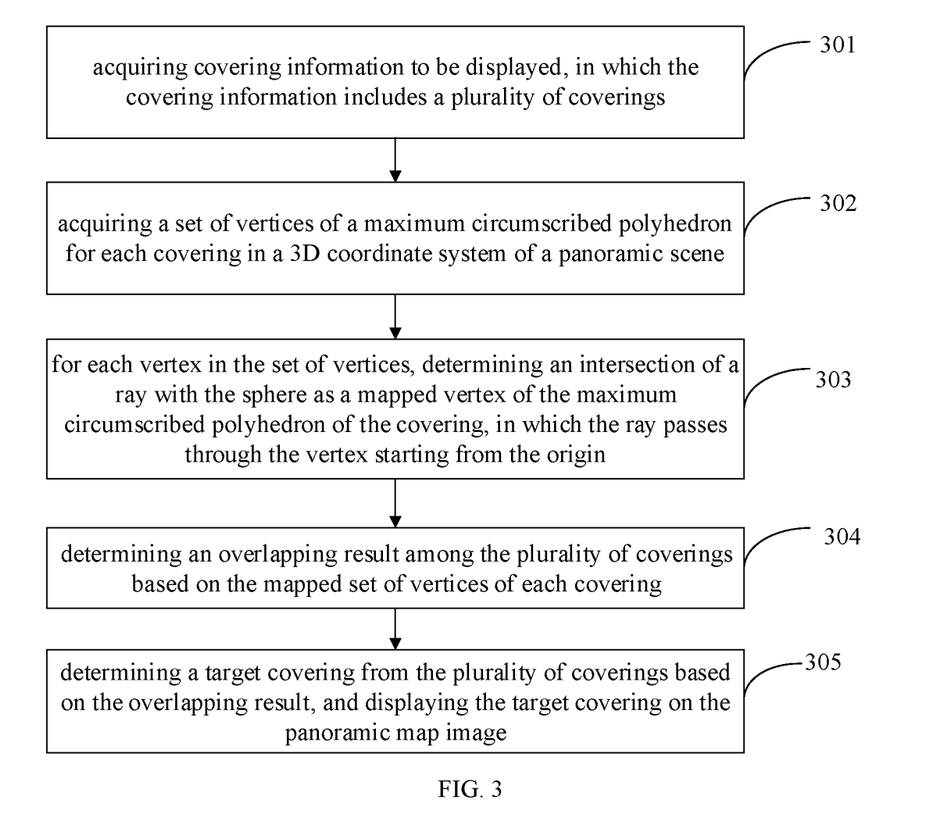
FIG. 3 is a flowchart of a method for displaying a covering according to another embodiment of the disclosure.

FIG. 3 is a flowchart of a method for displaying a covering according to another embodiment of the disclosure.

As illustrated in FIG. 3, the method for displaying a covering may include the following steps at 301-305.

At 301, covering information to be displayed on a panoramic map image is acquired. The covering information includes a plurality of coverings.

At 302, a set of vertices of a maximum circumscribed polyhedron for each covering in a three-dimensional (3D) coordinate system of a panoramic scene is acquired.

At 303, for each vertex in the set of vertices, an intersection of a ray with the sphere model is determined as a mapped vertex of the maximum circumscribed polyhedron of the covering. Each ray passes through each vertex in the set of vertices starting from the origin of the 3D coordinate system of the panoramic scene.

In some embodiments, for the convenience of mapping the vertices, the origin of the 3D coordinate system of the panoramic scene coincides with the sphere center of the sphere model.

A radius R of the above sphere model is preset.

In some embodiments, the radius R of the sphere model may be the same as the radius R of the sphere model used by the panoramic map image.

At 304, an overlapping result among the plurality of coverings is determined based on the mapped set of vertices of each of the coverings.

At 305, based on the overlapping result, a target covering is determined from the plurality of coverings, and displayed on the panoramic map image.

In the embodiment, in a process of mapping the set of vertices of the maximum circumscribed polyhedron of the covering in the 3D coordinate system of the panoramic scene to the sphere model, for each vertex in the set of vertices, an intersection of a ray with the sphere model is taken as a mapped vertex of the maximum circumscribed polyhedron of the covering, the ray passing through the vertex with the origin being a starting point. Thus, a simple mapping method is provided to accurately map the set of vertices of the maximum circumscribed polyhedron of the covering in the 3D coordinate system of the panoramic scene to the sphere model so as to acquire the mapped set of vertices of the covering.

On the basis of any embodiment, determining the overlapping result among the plurality of coverings based on the mapped set of vertices of each covering may be implemented by different ways in different application scenes.

As an example implementation, collision detection may be performed on any two of the plurality of coverings based on the mapped set of vertices of each covering. The overlapping result for the plurality of coverings is determined based on the collision detection results.

Figure 4:
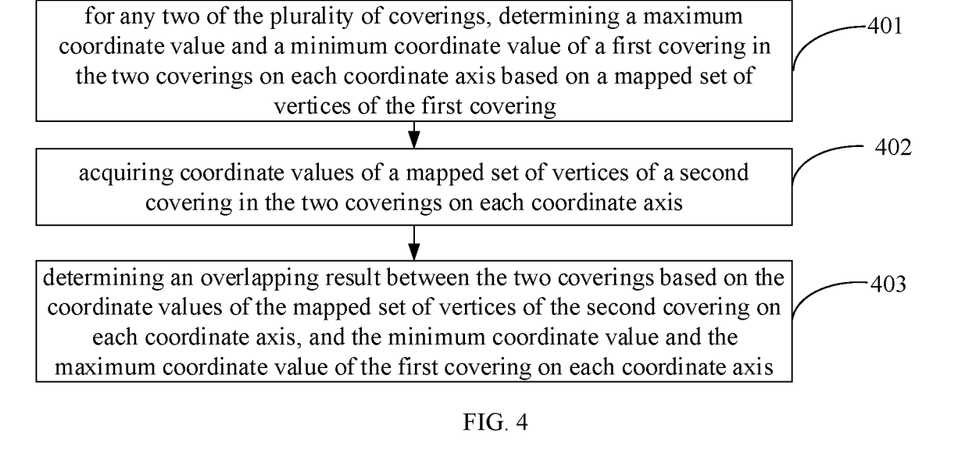
FIG. 4 is a detailed flowchart of determining an overlapping result among a plurality of coverings based on the mapped set of vertices of each covering.

As another example implementation, as illustrated in FIG. 4, the method may include the following steps at 401-403.

At 401, for any two of the plurality of coverings, a maximum coordinate value and a minimum coordinate value of a first covering in the two coverings on each coordinate axis are determined based on a mapped set of vertices of the first covering.

At 402, coordinate values of a mapped set of vertices of a second covering in the two coverings on each coordinate axis are acquired.

At 403, an overlapping result between the two coverings is determined based on the coordinate values of the mapped set of vertices of the second covering on each coordinate axis, and the minimum coordinate value and the maximum coordinate value of the first covering on each coordinate axis.

It may be understood that the first covering is one of any two coverings, and the second covering is the other of any two coverings.

In the embodiment, in order to reduce complexity, for any two of the plurality of coverings, combining the minimum coordinate value and the maximum coordinate value of the first covering on each coordinate axis, with the coordinate values of the mapped set of vertices of the second covering on each coordinate axis, the overlapping result between two coverings is accurately determined.

In some embodiments, in order to accurately determine the overlapping result between two coverings, a possible implementation of the step at 403 includes: determining that there are an overlap between the two coverings in response to a coordinate value of the mapped set of vertices of the second covering on each coordinate axis being between the minimum coordinate value and the maximum coordinate value of the first covering on the coordinate axis; and determining that there are not an overlap between the two coverings in response to a coordinate value of the mapped set of vertices of the second covering on each coordinate axis being not between the minimum coordinate value and the maximum coordinate value of the first covering on the coordinate axis.

Figure 5:
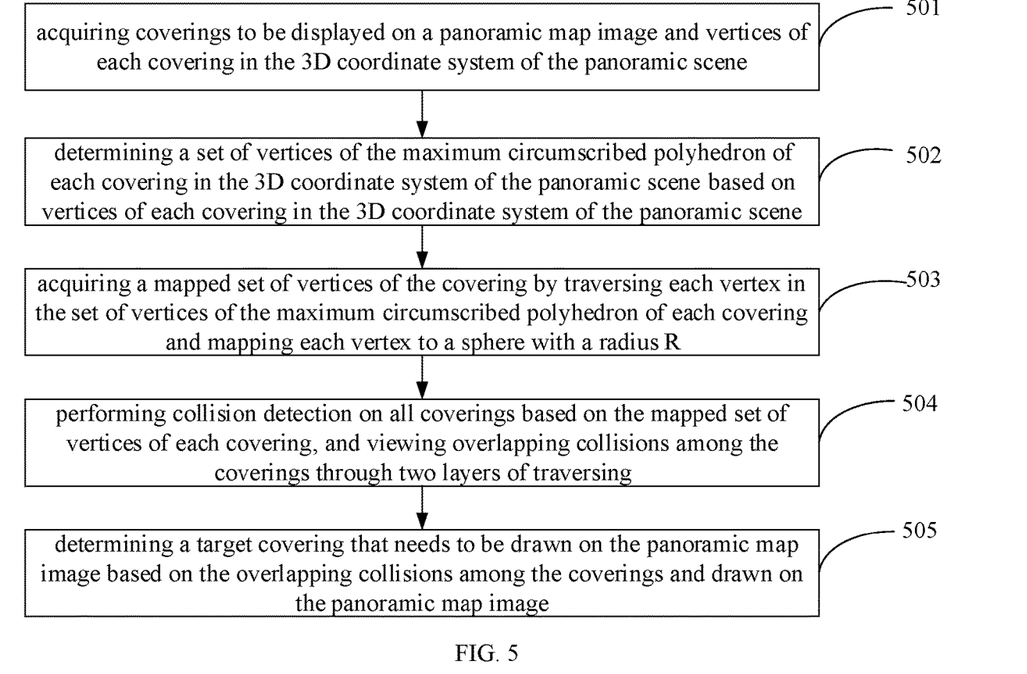
FIG. 5 is a flowchart of a method for displaying a covering according to another embodiment of the disclosure.

In order to make those skilled in the art understand the disclosure clearly, the method for displaying a covering may be described exemplarily in combination with FIG. 5. The method may include the following steps as illustrated in FIG. 5.

At 501, coverings to be displayed on a panoramic map image are acquired, and vertices of each covering in the 3D coordinate system of the panoramic scene are acquired.

At 502, a set of vertices of the maximum circumscribed polyhedron of each covering in the 3D coordinate system of the panoramic scene is determined based on vertices of each covering in the 3D coordinate system of the panoramic scene.

Specifically, coordinate information of vertices of each covering may be acquired, and a maximum coordinate value and a minimum coordinate value of each covering on x coordinate axis, y coordinate axis and z coordinate axis may be determined based on the coordinate information of vertices.

When the maximum coordinate value and the minimum coordinate value of the covering on x coordinate axis, y coordinate axis and z coordinate axis are acquired, the maximum coordinate value and the minimum coordinate value of the covering on x coordinate axis, y coordinate axis and z coordinate axis may be combined to acquire a set of vertices of the maximum circumscribed polyhedron of the covering in the 3D coordinate system of the panoramic scene. The set of vertices include 8 vertices.

At 503, a mapped set of vertices of the covering is acquired by traversing each vertex in the set of vertices of the maximum circumscribed polyhedron of each covering and mapping each vertex to a sphere with a radius R.

Specifically, for the first vertex $a0(x0, y0, z0)$ of a covering, an intersection $p0(x0, y0, z0)$ of a ray with the sphere is acquired, in which the ray has the origin of the 3D coordinate system of the panoramic scene as a starting point and passes through the vertex $a0(x0, y0, z0)$. With the similar way, the remaining vertices $a1$ to $a7$ in the set of vertices are traversed to acquire the corresponding intersections $p1$ to $p7$. In this way, the mapped set P of vertices is acquired including 8 end points of rays intersected with the sphere.

At 504, collision detection may be performed on all coverings based on the mapped set of vertices of each covering, and overlapping collisions among the coverings are viewed through two layers of traversing.

At 505, a target covering that needs to be drawn on the panoramic map image is determined based on the overlapping collisions among the coverings and drawn on the panoramic map image.

In the embodiment, collision detection is performed on the coverings in combination with a set of vertices of each covering mapped to the same spherical surface, and the covering drawing on the panoramic map image is controlled based on the collision detection results, so that the drawing effect of the covering is more stable.

In order to achieve the above embodiment, the embodiment of the disclosure further provides an apparatus for displaying a covering in the embodiment of the disclosure.

Figure 6:
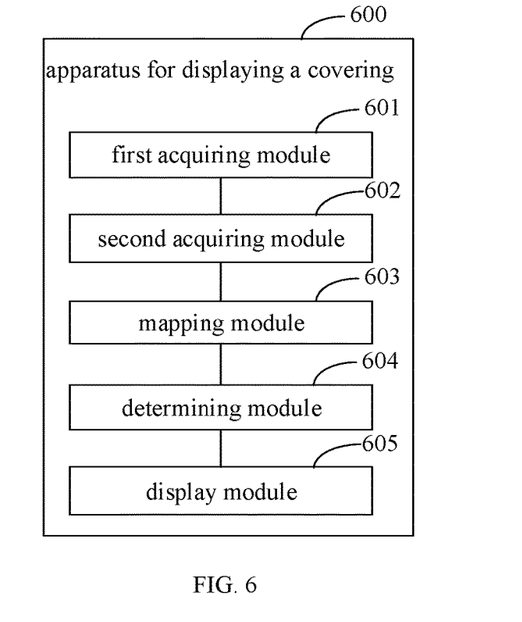
FIG. 6 is a structural diagram of an apparatus for displaying a covering according to an embodiment of the disclosure.

FIG. 6 is a diagram of a structure of an apparatus for displaying a covering according to an embodiment of the disclosure.

As illustrated in FIG. 6, the apparatus 600 for displaying a covering may include a first acquiring module 601, a second acquiring module 602, a mapping module 603, a determining module 604 and a display module 605.

The first acquiring module 601 is configured to acquire covering information to be displayed on a panoramic map image, in which the covering information comprises a plurality of coverings.

The second acquiring module 602 is configured to acquire a set of vertices of a maximum circumscribed polyhedron for each covering in a three-dimensional coordinate system of a panoramic scene.

The mapping module 603 is configured to acquire a mapped set of vertices of the maximum circumscribed polyhedron of each covering by mapping the set of vertices to a sphere model.

The determining module 604 is configured to determine an overlapping result among the plurality of coverings based on the mapped set of vertices of each covering.

The display module 605 is configured to determine a target covering from the plurality of coverings based on the overlapping result, and displaying the target covering on the panoramic map image.

It should be noted that the foregoing explanation of the embodiment of a method for displaying a covering also applies to the embodiment, which will not be repeated here.

In the apparatus for displaying a covering in the embodiment of the disclosure, covering information to be displayed on the panoramic map image is acquired, the set of vertices of the maximum circumscribed polyhedron for each covering in the 3D coordinate system of the panoramic scene is acquired, the mapped set of vertices of the maximum circumscribed polyhedron of the covering is acquired by mapping the set of vertices to the sphere model, the overlapping result among the plurality of coverings is determined based on the mapped set of vertices of each covering, and the target covering is determined from the plurality of coverings based on the overlapping result and displayed on the panoramic map image. Thus, the overlapping result among the plurality of coverings is accurately determined based on the set of vertices of each covering mapped to the sphere model, and the covering is accurately displayed on the panoramic map image based on the overlapping result, which improves the display result of the covering on the panoramic map image.

Figure 7:
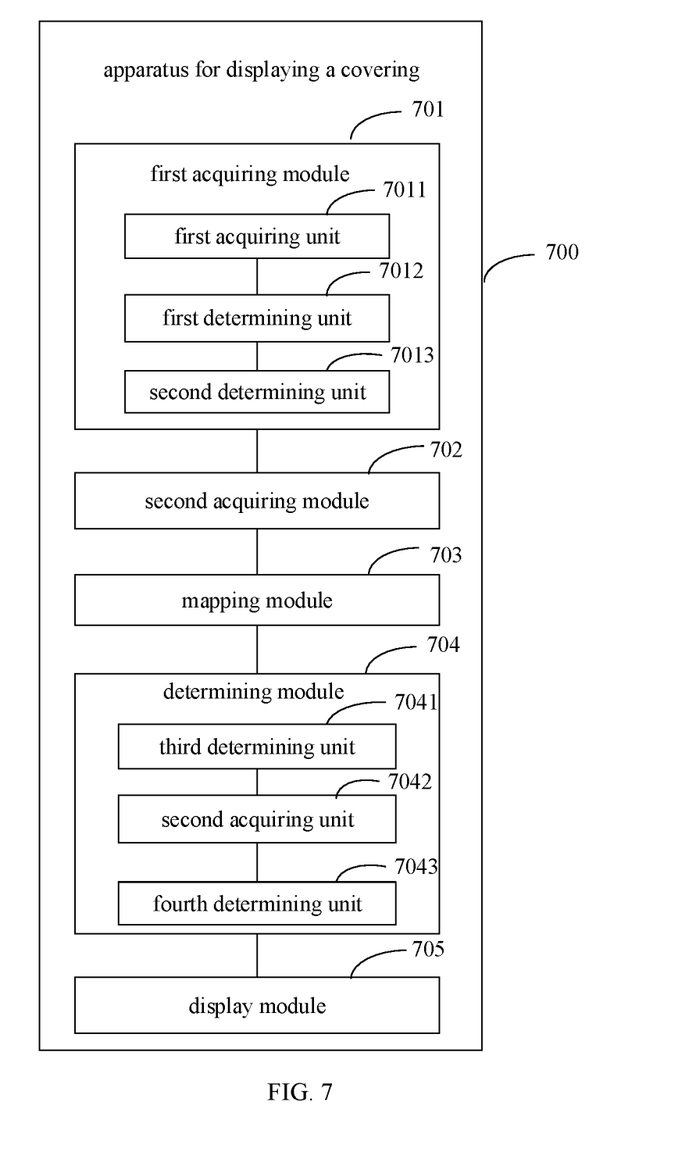
FIG. 7 is a structural diagram of an apparatus for displaying a covering according to another embodiment of the disclosure.

In an embodiment of the disclosure, as illustrated in FIG. 7, the apparatus for displaying a covering may include: a first acquiring module 701, a second acquiring module 702, a mapping module 703, a determining module 704 and a display module 705. The first acquiring module 701 may include a first acquiring unit 7011, a first determining unit 7012 and a second determining unit 7013. The determining module 704 may include: a third determining unit 7041, a second acquiring unit 7042 and a fourth determining unit 7043.

With respect to the detailed description of the second acquiring module 702, the mapping module 703 and the display module 705, please refer to the description of the second acquiring module 602, the mapping module 603 and the display module 605 as illustrated in FIG. 6, which is not repeated here.

The first acquiring module 701 may include a first acquiring unit 7011, a first determining unit 7012 and a second determining unit 7013.

The first acquiring unit 7011 is configured to acquire coordinate information of each vertex of the covering in the 3D coordinate system of the panoramic scene.

The first determining unit 7012 is configured to determine a maximum coordinate value and a minimum coordinate value of the covering on each coordinate axis based on the coordinate information of each vertex.

The second determining unit 7013 is configured to determine the set of vertices of the maximum circumscribed polyhedron of the covering in the 3D coordinate system of the panoramic scene based on the maximum coordinate value and the minimum coordinate value of the covering on each coordinate axis.

In an embodiment of the disclosure, an origin of the 3D coordinate system of the panoramic scene coincides with a sphere center of the sphere model. The mapping module 703 is specifically configured to: for each vertex in the set of vertices, determine an intersection of a ray with the sphere model as a mapped vertex of the maximum circumscribed polyhedron of the covering, in which the ray passes through the vertex starting from the origin.

In an embodiment of the disclosure, the determining module 704 may include a third determining unit 7041, a second acquiring unit 7042, and a fourth determining unit 7043.

The third determining unit 7041 is configured to for any two of the plurality of coverings, determine a maximum coordinate value and a minimum coordinate value of a first covering in the two coverings on each coordinate axis based on a mapped set of vertices of the first covering. The second acquiring unit 7042 is configured to acquire coordinate values of a mapped set of vertices of a second covering in the two coverings on each coordinate axis. The fourth determining unit 7043 is configured to determine an overlapping result between the two coverings based on the coordinate values of the mapped set of vertices of the second covering on each coordinate axis, and the minimum coordinate value and the maximum coordinate value of the first covering on each coordinate axis.

In an embodiment of the disclosure, the fourth determining unit 7043 is specifically configured to: in response to a coordinate value of the mapped set of vertices of the second covering on any coordinate axis being between the minimum coordinate value and the maximum coordinate value of the first covering on the coordinate axis, determine that there is an overlap between the two coverings; and in response to a coordinate value of the mapped set of vertices of the second covering on each coordinate axis being not between the minimum coordinate value and the maximum coordinate value of the first covering on the coordinate axis, determine that there is no overlap between the two coverings.

It should be noted that the foregoing explanation of the method embodiments for displaying a covering also apply to apparatus embodiments for displaying a covering, which will not be repeated here.

According to the embodiments of the disclosure, the disclosure further provides an electronic device, a readable storage medium and a computer program product.

Figure 8:
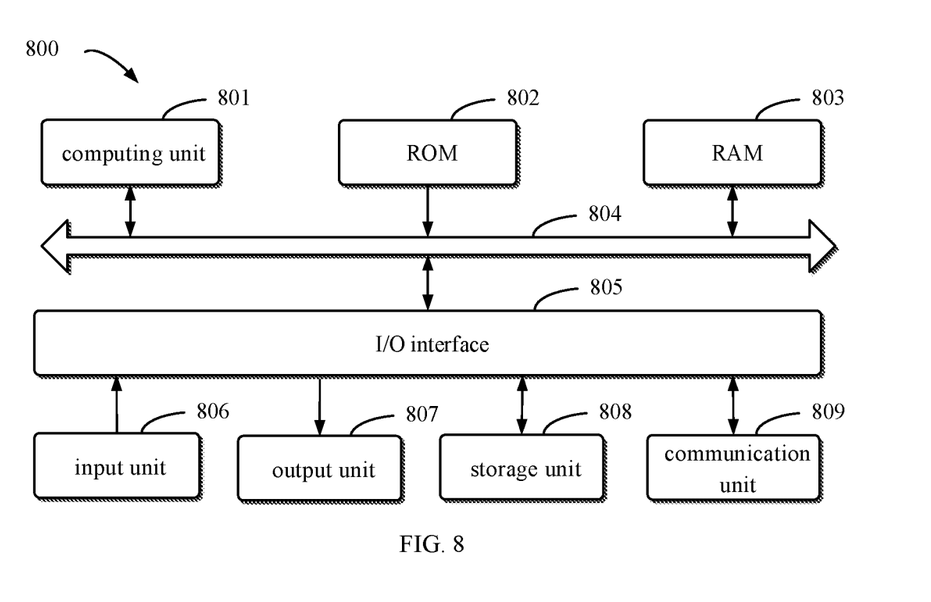
FIG. 8 is a block diagram of an electronic device configured to implement a method for displaying a covering in the embodiment of the disclosure.

FIG. 8 illustrates a block diagram of an example electronic device 800 configured to implement a method for displaying a covering in the embodiment of the disclosure. The electronic device is intended to represent various types of digital computers, such as laptop computers, desktop computers, workstations, personal digital assistants, servers, blade servers, mainframe computers, and other suitable computers. The electronic device may also represent various types of mobile devices, such as personal digital assistants, cellular phones, smart phones, wearable devices, and other similar computing devices. The components shown herein, their connections and relations, and their functions are merely exemplary and are not intended to limit the implementation in the disclosure as described and/or required herein.

As illustrated in FIG. 8, the device 800 includes a computing unit 801, which may execute various appropriate actions and processes based on computer program(s) stored in a read-only memory (ROM) 802 or computer program(s) loaded into a random access memory (RAM) 803 from a storage unit 808. In the RAM 803, various programs and data required for operation of the device 800 may also be stored. The computing unit 801, ROM 802 and ROM 803 may be connected with each other by a bus 804. An input/output (I/O) interface 805 is also connected to the bus 804.

A plurality of components in the device 800 connected to the I/O interface 805 include: an input unit 806, for example, a keyboard, a mouse, etc.; an output unit 807, for example various types of displays, speakers; a memory unit 808, for example a magnetic disk, an optical disk; and a communication unit 809, for example, a network card, a modem, a wireless transceiver. The communication unit 809 allows the device 800 to exchange information/data through a computer network such as internet and/or various types of telecommunication networks and other devices.

The computing unit 801 may be various types of general and/or dedicated processing components with processing and computing ability. Some examples of the computing unit 801 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 801 performs various methods and processes as described above, for example, a method for displaying a covering. For example, in some embodiments, a method for displaying a covering may be further implemented as a computer software program, which is physically contained in a machine readable medium, such as the memory unit 808. In some embodiments, some or all of the computer programs may be loaded and/or mounted on the device 800 via the ROM 802 and/or the communication unit 809. When the computer program is loaded to the RAM 803 and performed by the computing unit 801, one or more blocks in the method for displaying a covering as described above may be performed. Alternatively, in other embodiments, the computing unit 801 may be configured to perform a method for displaying a covering in other appropriate ways (for example, by virtue of a firmware).

Various implementation modes of the systems and technologies described above may be implemented in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine-readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, also known as a cloud computing server or a cloud host, is a host product in a cloud computing service system, to solve the shortcomings of large management difficulty and weak business expansibility existed in the conventional physical host and Virtual Private Server (VPS) service. A server further may be a server with a distributed system, or a server in combination with a blockchain.

It should be understood that, various forms of procedures shown above may be configured to reorder, add or delete blocks. For example, blocks described in the disclosure may be executed in parallel, sequentially, or in a different order, as long as the desired result of the technical solution disclosed in the present disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of the present disclosure.

What is claimed is:

1. A method for displaying a covering on a panoramic map image, comprising:
  acquiring covering information to be displayed, in which the covering information comprises a plurality of coverings;
  acquiring a set of vertices of a maximum circumscribed polyhedron for each covering in a three-dimensional (3D) coordinate system of a panoramic scene;
  acquiring a mapped set of vertices of the maximum circumscribed polyhedron of each covering by mapping the set of vertices to a sphere;
  determining an overlapping result among the plurality of coverings based on the mapped set of vertices of each covering; and
  determining a target covering from the plurality of coverings based on the overlapping result, and displaying the target covering on the panoramic map image.

2. The method of claim 1, wherein acquiring the set of vertices of the maximum circumscribed polyhedron for each covering in the 3D coordinate system of the panoramic scene comprises:
  acquiring coordinate information of each vertex of the covering in the 3D coordinate system of the panoramic scene;
  determining a maximum coordinate value and a minimum coordinate value of the covering on each coordinate axis based on the coordinate information of each vertex; and
  determining the set of vertices of the maximum circumscribed polyhedron of the covering in the 3D coordinate system of the panoramic scene based on the maximum coordinate value and the minimum coordinate value of the covering on each coordinate axis.

3. The method of claim 1, wherein an origin of the 3D coordinate system of the panoramic scene coincides with a center of the sphere, and acquiring the mapped set of vertices of the maximum circumscribed polyhedron of each covering by mapping the set of vertices to the sphere comprises:
  for each vertex in the set of vertices, determining an intersection of a ray with the sphere as a mapped vertex of the maximum circumscribed polyhedron of the covering, in which the ray passes through the vertex starting from the origin.

4. The method of claim 1, wherein determining the overlapping result among the plurality of coverings comprises:
  for any two of the plurality of coverings,
  determining a maximum coordinate value and a minimum coordinate value of a first covering in the two coverings on each coordinate axis based on a mapped set of vertices of the first covering;
  acquiring coordinate values of a mapped set of vertices of a second covering in the two coverings on each coordinate axis; and
  determining an overlapping result between the two coverings based on the coordinate values of the mapped set of vertices of the second covering on each coordinate axis, and the minimum coordinate value and the maximum coordinate value of the first covering on each coordinate axis.

5. The method of claim 4, wherein determining the overlapping result between the two coverings comprises:
  in response to a coordinate value of the mapped set of vertices of the second covering on a coordinate axis being between the minimum coordinate value and the maximum coordinate value of the first covering on the coordinate axis, determining that there is an overlap between the two coverings; and
  in response to a coordinate value of the mapped set of vertices of the second covering on each coordinate axis being not between the minimum coordinate value and the maximum coordinate value of the first covering on each coordinate axis, determining that there is no overlap between the two coverings.

6. An apparatus for displaying a covering a covering on a panoramic map image, comprising:
  at least one processor; and
  a memory stored with instructions executed by the at least one processor;
  wherein when the instructions are executed by the at least one processor, the at least one processor is configured to
  acquire covering information to be displayed, in which the covering information comprises a plurality of coverings;
  acquire a set of vertices of a maximum circumscribed polyhedron for each covering in a three-dimensional coordinate (3D) system of a panoramic scene;
  acquire a mapped set of vertices of the maximum circumscribed polyhedron of each covering by mapping the set of vertices to a sphere;
  determine an overlapping result among the plurality of coverings based on the mapped set of vertices of each covering; and
  determine a target covering from the plurality of coverings based on the overlapping result, and displaying the target covering on the panoramic map image.

7. The apparatus of claim 6, wherein the at least one processor is further configured to:
  acquire coordinate information of each vertex of the covering in the 3D coordinate system of the panoramic scene;
  determine a maximum coordinate value and a minimum coordinate value of the covering on each coordinate axis based on the coordinate information of each vertex; and
  determine the set of vertices of the maximum circumscribed polyhedron of the covering in the 3D coordinate system of the panoramic scene based on the maximum coordinate value and the minimum coordinate value of the covering on each coordinate axis.

8. The apparatus of claim 6, wherein an origin of the 3D coordinate system of the panoramic scene coincides with a center of the sphere, and the at least one processor is further configured to:
  for each vertex in the set of vertices, determine an intersection of a ray with the sphere as a mapped vertex of the maximum circumscribed polyhedron of the covering, in which the ray passes through the vertex starting from the origin.

9. The apparatus of claim 6, wherein the at least one processor is further configured to:
  for any two of the plurality of coverings,
  determine a maximum coordinate value and a minimum coordinate value of a first covering in the two coverings on each coordinate axis based on a mapped set of vertices of the first covering;
  acquire coordinate values of a mapped set of vertices of a second covering in the two coverings on each coordinate axis; and
  determine an overlapping result between the two coverings based on the coordinate values of the mapped set of vertices of the second covering on each coordinate axis, and the minimum coordinate value and the maximum coordinate value of the first covering on each coordinate axis.

10. The apparatus of claim 9, wherein the at least one processor is further configured to:
in response to a coordinate value of the mapped set of vertices of the second covering on a coordinate axis being between the minimum coordinate value and the maximum coordinate value of the first covering on the coordinate axis, determine that there is an overlap between the two coverings; and
in response to a coordinate value of the mapped set of vertices of the second covering on each coordinate axis being not between the minimum coordinate value and the maximum coordinate value of the first covering on each coordinate axis, determine that there is no overlap between the two coverings.

11. A non-transitory computer readable storage medium having computer instructions stored thereon, wherein when the computer instructions are executed by a computer, a method for displaying a covering on a panoramic map image is implemented, the method comprising:
acquiring covering information to be displayed, in which the covering information comprises a plurality of coverings;
acquiring a set of vertices of a maximum circumscribed polyhedron for each covering in a three-dimensional (3D) coordinate system of a panoramic scene;
acquiring a mapped set of vertices of the maximum circumscribed polyhedron of each covering by mapping the set of vertices to a sphere;
determining an overlapping result among the plurality of coverings based on the mapped set of vertices of each covering; and
determining a target covering from the plurality of coverings based on the overlapping result, and displaying the target covering on the panoramic map image.

12. The storage medium of claim 11, wherein acquiring the set of vertices of the maximum circumscribed polyhedron for each covering in the 3D coordinate system of the panoramic scene comprises:
acquiring coordinate information of each vertex of the covering in the 3D coordinate system of the panoramic scene;
determining a maximum coordinate value and a minimum coordinate value of the covering on each coordinate axis based on the coordinate information of each vertex; and
determining the set of vertices of the maximum circumscribed polyhedron of the covering in the 3D coordinate system of the panoramic scene based on the maximum coordinate value and the minimum coordinate value of the covering on each coordinate axis.

13. The storage medium of claim 11, wherein an origin of the 3D coordinate system of the panoramic scene coincides with a center of the sphere, and acquiring the mapped set of vertices of the maximum circumscribed polyhedron of each covering by mapping the set of vertices to the sphere comprises:
for each vertex in the set of vertices, determining an intersection of a ray with the sphere as a mapped vertex of the maximum circumscribed polyhedron of the covering, in which the ray passes through the vertex starting from the origin.

14. The storage medium of claim 11, wherein determining the overlapping result among the plurality of coverings comprises:
for any two of the plurality of coverings,
determining a maximum coordinate value and a minimum coordinate value of a first covering in the two coverings on each coordinate axis based on a mapped set of vertices of the first covering;
acquiring coordinate values of a mapped set of vertices of a second covering in the two coverings on each coordinate axis; and
determining an overlapping result between the two coverings based on the coordinate values of the mapped set of vertices of the second covering on each coordinate axis, and the minimum coordinate value and the maximum coordinate value of the first covering on each coordinate axis.

15. The storage medium of claim 14, wherein determining the overlapping result between the two coverings comprises:
in response to a coordinate value of the mapped set of vertices of the second covering on a coordinate axis being between the minimum coordinate value and the maximum coordinate value of the first covering on the coordinate axis, determining that there is an overlap between the two coverings; and
in response to a coordinate value of the mapped set of vertices of the second covering on each coordinate axis being not between the minimum coordinate value and the maximum coordinate value of the first covering on each coordinate axis, determining that there is no overlap between the two coverings.

* * * * *